(12) United States Patent
Zhou

(10) Patent No.: US 11,425,394 B2
(45) Date of Patent: Aug. 23, 2022

(54) METHOD AND APPARATUS FOR DETERMINING VIDEO BIT RATE, AND ELECTRONIC DEVICE

(71) Applicant: Beijing Dajia Internet Information Technology Co., Ltd., Beijing (CN)

(72) Inventor: Chao Zhou, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/570,137

(22) Filed: Jan. 6, 2022

(65) Prior Publication Data

US 2022/0132139 A1 Apr. 28, 2022

Related U.S. Application Data

(63) Continuation of application No. PCT/CN2020/100737, filed on Jul. 7, 2020.

(30) Foreign Application Priority Data

Jul. 24, 2019 (CN) .......................... 201910672469.2

(51) Int. Cl.
*H04N 19/15* (2014.01)
*H04N 19/103* (2014.01)
(Continued)

(52) U.S. Cl.
CPC ........... *H04N 19/15* (2014.11); *H04N 19/103* (2014.11); *H04N 19/176* (2014.11); *H04N 19/189* (2014.11)

(58) Field of Classification Search
CPC .... H04N 19/15; H04N 19/103; H04N 19/176; H04N 19/189
See application file for complete search history.

(56) References Cited

U.S. PATENT DOCUMENTS

| 6,310,857 | B1 * | 10/2001 | Duffield | H04Q 11/0478 |
| | | | | 370/232 |
| 2006/0218264 | A1 * | 9/2006 | Ogawa | H04L 47/18 |
| | | | | 709/223 |

(Continued)

FOREIGN PATENT DOCUMENTS

| CN | 1557072 A | * 12/2004 | | H04L 47/10 |
| CN | 1886968 A | 12/2006 | | |

(Continued)

OTHER PUBLICATIONS

Wang et al, Improving Robustness of Dash Against Network Uncertainty, 2019 IEEE International Conference on Multimedia and Expo (ICME), pp. 748-753.

(Continued)

*Primary Examiner* — Maria E Vazquez Colon
(74) *Attorney, Agent, or Firm* — Meunier Carlin & Curfman LLC

(57) ABSTRACT

Disclosed are a video bit rate determining method and apparatus, an electronic device, a storage medium. The method includes: determining a cancellation parameter $\xi(k)$ for cancelling a throughput prediction error of a video block $F_k$; determining a cache amount prediction value of each of video blocks from the video block $F_k$ to the video block $F_{k+N-1}$ at the end of download thereof based on a throughput prediction value of the video blocks and $\xi(k)$; determining a video playback quality loss value according to a weight value of the bit rate change between adjacent video blocks requested and a cache prediction error between the cache amount prediction value and a preset cache amount target value of the video blocks at the end of download thereof, requesting the video block $F_k$ at a bit rate that does not exceed a bit rate $r(k)$ when the video playback quality loss value is minimum.

18 Claims, 8 Drawing Sheets

(51) Int. Cl.
*H04N 19/189* (2014.01)
*H04N 19/176* (2014.01)

(56) References Cited

U.S. PATENT DOCUMENTS

| | | | |
|---|---|---|---|
| 2007/0106813 | A1 | 5/2007 | Bordes et al. |
| 2014/0282792 | A1* | 9/2014 | Bao .................... H04N 21/8456 725/116 |
| 2016/0234078 | A1* | 8/2016 | Jana ........................ H04L 47/30 |
| 2017/0026713 | A1* | 1/2017 | Yin ...................... H04N 21/643 |
| 2018/0167431 | A1* | 6/2018 | Kim .................... H04L 41/0896 |
| 2018/0167436 | A1 | 6/2018 | Han et al. |
| 2021/0144189 | A1* | 5/2021 | Klejsa ................... H04L 47/827 |

FOREIGN PATENT DOCUMENTS

| | | | | |
|---|---|---|---|---|
| CN | 103069740 | A | | 4/2013 |
| CN | 106453270 | A | | 2/2017 |
| CN | 106453270 | A | * | 2/2017 ............. H04L 65/40 |
| CN | 106464601 | A | * | 2/2017 ............. H04L 47/115 |
| CN | 107079179 | A | * | 8/2017 ......... H04L 47/2416 |
| CN | 107613330 | A | | 1/2018 |
| CN | 107613330 | A | * | 1/2018 |
| CN | 109218781 | A | * | 1/2019 |
| CN | 109218781 | A | | 1/2019 |
| CN | 109792545 | A | * | 5/2019 ....... H04N 21/23439 |
| CN | 110300315 | A | | 10/2019 |
| JP | 2009089416 | A | * | 4/2009 ............ H04L 47/10 |
| JP | 2017069849 | A | * | 4/2017 |
| KR | 101837637 | B1 | * | 3/2018 |
| WO | 2016080884 | A1 | | 5/2016 |
| WO | WO-2017210252 | A1 | * | 12/2017 ........... G06F 8/4451 |

OTHER PUBLICATIONS

Yin et al, A Control-Theoretic Approach for Dynamic Adaptive Video Streaming over HTTP, ACM Conference on Special Interest Group on Data Communication, 2015, pp. 325-338.

English translation of First Office Action issued in CN201910672469. 2,, dated Feb. 20, 2021.

International Search Report issued in PCT/CN2020/100737, dated Sep. 27, 2020.

English Translation of Notification to Grant Patent issued in CN201910672469.2, dated Jul. 21, 2021.

* cited by examiner

METHOD AND APPARATUS FOR DETERMINING VIDEO BIT RATE, AND ELECTRONIC DEVICE

CROSS REFERENCE TO RELATED APPLICATIONS

The application is a continuation of International Application No. PCT/CN2020/100737, filed on Jul. 7, 2020, which claims priority to the Chinese Patent Application No. 201910672469.2, filed on Jul. 24, 2019, the entire contents of which are incorporated herein by reference.

FIELD

The present disclosure relates to the technical field of video playback, in particular to a method and apparatus for determining a video bit rate, an electronic device, and a storage medium.

BACKGROUND

When video playback services are provided, in order to provide good quality of experience (QoE) under dynamically changing network conditions, many video players currently use consecutively numbered video blocks to play videos. When each video is cut into many blocks, a video player applies an adaptive bit rate algorithm to switch a video bit rate in units of blocks to adapt to the current network conditions. The higher the bit rate is, the better the quality of the videos is.

The purpose of the adaptive bit rate algorithm is to provide a good QoE, which mainly includes three parts: a high video bit rate, less playback stuttering, and less bit rate switching. At present, the adaptive bit rate (ABR) algorithm is often used to switch the bit rate. The algorithm predicts a future throughput when selecting a bit rate for each video block, and maximizes a defined QoE factor in a prediction space.

SUMMARY

In a first aspect, an embodiment of the present disclosure provides a method for determining a video bit rate. The method is applied in a device for playing a video based on consecutively numbered video blocks, and includes:

determining a cancellation parameter $\xi(k)$ configured to cancel a throughput prediction error of a k-th video block $F_k$, k being a positive integer;

determining, a cache amount prediction value of each of video blocks from the video block $F_k$ to a(k+N−1)-th video block $F_{k+N-1}$ at the end of download thereof based on a throughput prediction value of each of the video blocks from the video block $F_k$ to the (k+N−1)-th video block $F_{k+N-1}$ and the cancellation parameter $\xi(k)$, N being a positive integer greater than 1;

determining a video playback quality loss value based on a weight value of a bit rate change between adjacent video blocks requested and a cache prediction error between the cache amount prediction value and a preset cache amount target value of each of the video blocks from the video block $F_k$ to the (k+N−1)-th video block $F_{k+N-1}$ at the end of download thereof, and determining a bit rate r(k) in response to the video playback quality loss value being minimum; and requesting the video block $F_k$ at a bit rate that does not exceed the bit rate r(k).

In a second aspect, the present disclosure provides an electronic device, including a processor and a memory configured to store an executable instruction of the processor:

the processor is configured to execute followings:

determining a cancellation parameter $\xi(k)$ configured to cancel a throughput prediction error of a k-th video block $F_k$, k being a positive integer;

determining a cache amount prediction value of each of video blocks from the video block $F_k$ to a(k+N−1)-th video block $F_{k+N-1}$ at the end of download thereof based on a throughput prediction value of each of the video blocks from the video block $F_k$ to the (k+N−1)-th video block $F_{k+N-1}$ and the cancellation parameter $\xi(k)$, N being a positive integer greater than 1;

determining a video playback quality loss value based on a weight value of a bit rate change between adjacent video blocks requested and a cache prediction error between the cache amount prediction value and a preset cache amount target value of each of the video blocks from the video block $F_k$ to the video block $F_{k+N-1}$ at the end of download thereof, and determining a bit rate r(k) in response to the video playback quality loss value being minimum; and requesting the video block $F_k$ at a bit rate that does not exceed the bit rate r(k).

In a third aspect, the present disclosure further provides a non-transitory computer storage medium, on which a computer program is stored, and the method described in the first aspect of the present disclosure are implemented in response to the program being executed by a processing unit.

BRIEF DESCRIPTION OF THE DRAWINGS

In order to more clearly illustrate the technical solutions in the embodiments of the present disclosure, the drawings used in the description of the embodiments are briefly described below, and it is obvious that the drawings in the description below are only some embodiments of the present disclosure, and that other drawings can be obtained from these drawings without involving any inventive effort for those ordinarily skilled in the art.

DETAILED DESCRIPTION OF THE EMBODIMENTS

Figure 1:
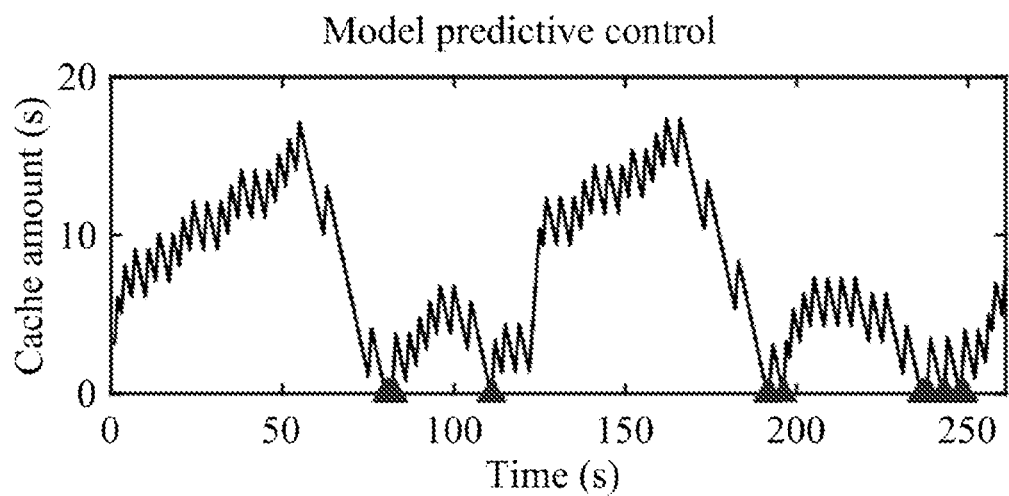
FIG. 1 is a schematic diagram of a cache amount change condition of an MPC algorithm in a video session provided according to an embodiment of the present disclosure.

In order to enable the objectives, technical solutions, and advantages of the present disclosure to be clearer, the present disclosure will be described in further detail below with reference to the accompanying drawings, and apparently, the described embodiments are merely some, but not all embodiments of this disclosure. Based on the embodiments in the present disclosure, all other embodiments obtained by those ordinarily skilled in the art without involving any inventive effort are within the scope of protection of the present disclosure.

The disclosure scenarios described in the embodiments of the present disclosure are intended to more clearly illustrate the technical solutions of the embodiments of the present disclosure, and do not constitute a limitation on the technical solutions provided in the embodiments of the present disclosure. Those ordinarily skilled in the art know that with the emergence of the disclosure scenarios, the technical solutions provided in the embodiments of the present disclosure are equally applicable to similar technical problems. In the description of the present disclosure, unless otherwise specified, "a plurality" means two or more than two.

When video playback services are provided, in order to provide good quality of experience (QoE) under dynamically changing network conditions, many video players currently use a dynamic adaptive streaming over HTTP (DASH) technology based on a hypertext transport protocol (HTTP) to transmit videos. In the DASH technology, each video is cut into many blocks, each block is encoded with a different bit rate, and the video players apply an adaptive bit rate algorithm to switch the video bit rate in units of blocks to adapt to the current network conditions. The higher the bit rate is, the better the quality of the videos is. The purpose of bit rate adaptation is to provide good QoE, which mainly includes three goals: a high video bit rate, less playback stuttering, and less bit rate switching.

The following briefly describes algorithms for playing the videos on the basis of consecutively numbered video blocks in related technologies.

1) An Average Bit Rate (ABR) Algorithm.

In the algorithm, various factors affecting QoE are combined into a unified function, the comprehensive QoE realized by the algorithm is measured by the function, when a bit rate is selected, a future throughput is predicted based on the optimized ABR algorithm, the defined QoE function is maximized in the prediction space, and a QoE model widely used in the ABR algorithm currently is as shown in formula 1:

$$QoE = \sum_{k=1}^{K} r(k) - \sum_{k=1}^{K} |r(k) - r(k-1)| - \mu \sum_{k=1}^{K} t(k); \quad \text{Formula 1}$$

where K is a total quantity of video blocks, $r(k)$ is a bit rate of a k-th block, $t(k)$ is stuttering time generated when the k-th block is downloaded, and $\mu$ is a stuttering penalty coefficient.

Since the ABR algorithm relies on throughput prediction, if the throughput prediction is inaccurate, the bit rate selected based on the throughput prediction will cause a serious stuttering problem.

2) Model Predictive Control (MPC).

In the algorithm, based on a current cache amount and a predicted throughput, the bit rate is selected by maximizing a QoE function of future 5 video blocks, and a QoE model is as shown in formula 1.

FIG. 1 shows a cache amount change condition of an MPC algorithm in a video session. It can be seen that MPC has a serious risk of stuttering: the cache amount in a player jitters greatly, the cache amount is often small, and once a prediction error or throughput jitter occurs, the cache will be easily drained, so stuttering is caused.

3) Robust Model Predictive Control (Robust MPC).

The algorithm uses the same bit rate selection method as MPC, and is still based on the current cache amount and the predicted throughput to select the bit rate by maximizing the QoE function of future 5 video blocks. In order to alleviate the impact of the prediction error, Robust MPC divides a throughput prediction value by the maximum prediction error observed in 5 historical video blocks, thereby making the bit rate selection more conservative.

Figure 2:
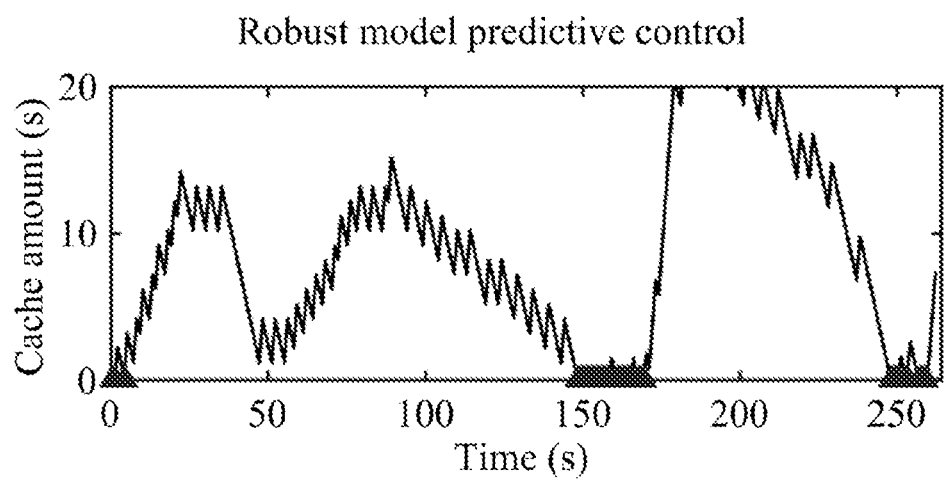
FIG. 2 is a schematic diagram of a cache amount change condition of a Robust MPC algorithm in a video session provided according to an embodiment of the present disclosure.

FIG. 2 shows a cache amount change condition of the Robust MPC algorithm in a video session. It can be seen that Robust MPC maintains a large cache amount, and has greater resistance to throughput jitter, and the caused stuttering time is reduced, but the drastic fluctuation of the cache amount is likely to cause stuttering events.

By tracking and analyzing the behavior of a video player client, the inventor found that the current optimization-based method lacks control over the evolution of the cache amount, that is, when the throughput changes drastically, the cache amount of the videos jitters greatly, there is often a small cache amount left in the video cache, and there is a great risk of draining. Moreover, in the process of video playback, currently commonly used video playback algorithms such as the ABR algorithm, the MPC algorithm and the Robust MPC algorithm all have the problem of cache amount draining, video playback stuttering, and incapability of taking three goals of QoE into account. Therefore, a video playback model needs to be redesigned.

The cache amount in the video playback process may be described as filling the videos at the throughput rate and excluding the videos at the bit rate. If the cache amount is kept at a constant level, the selected bit matches the throughput, and in the video playback process, playback stuttering is avoided. Therefore, the minimum cache amount prediction value is equivalent to the maximum bit rate, and the error of the cache amount target value is equivalent to the stuttering minimization.

However, in a real-time changing network, if a user wants to control the cache amount at a fixed level, the bit rate needs to be switched frequently, and frequently switching the bit rate will seriously reduce the QoE. Therefore, when the video playback model is redesigned, it is necessary to take the change of the bit rate into consideration.

In order to control the cache amount at a stable level and reduce bit rate switching, the present disclosure provides a video bit rate determining method and apparatus, an electronic device, and a storage medium. According to the method, the video playback quality loss value is determined according to a weight value of a bit rate change between adjacent video blocks requested, a cache amount prediction value of each of video blocks in future N (for example, the value of N is 5) video blocks from the current video block at the end of download thereof, and a cache prediction error of a preset cache amount target value, based on the principle of the minimum video playback quality loss value, a bit rate when the video playback quality loss value is minimum is determined, and the video block is requested at a bit rate that does not exceed the determined bit rate.

In addition, the cache amount prediction value of each of the video blocks in the future N video blocks from the current video block at the end of download thereof is determined on the basis of a throughput prediction value of each of the video blocks in the future N video blocks from the current video block and a cancellation parameter $\xi(k)$ configured to cancel a throughput prediction error of the current video block, the throughput prediction value of the current video block is determined on the basis of a download speed of each of the video blocks in historical M video blocks from the current video block, and then a throughput prediction value of each of the video blocks in the future N video blocks from the current video blocks is determined.

In order to ensure the accuracy of the cache amount prediction value of each of the video blocks in the future N video blocks from the current video block at the end of download thereof, and then ensuring accurate calculation of the maximum bit rate of the current video block, in the embodiment of the present disclosure, the corresponding cancellation parameter $\xi(k)$ is determined for each current video block. Compared with the use of the same cancellation parameter for each current video block in the related art, the estimation accuracy of the maximum bit rate of the current video block can be ensured.

It should be noted that k is a serial number of the current video block, k is a positive integer, N is a positive integer greater than 1, and M is a positive integer greater than 1 and less than k.

Hereinafter, the video bit rate determining method provided according to an embodiment of the present disclosure will be described in detail.

According to the embodiment of the present disclosure, a video block duration of each video block is the same, L represents the video block duration of each video block, and b(k+1) represents a cache amount of a k-th video block $F_k$ at the end of download thereof, r(k) represents a bit rate selected by the video block $F_k$, c(k) represents a download speed of the video block $F_k$, k is a serial number of consecutively numbered video blocks, and those skilled in the art may set the value range of k to be a positive integer set, and may also set the value range of k be a non-negative integer set.

Therefore, a cache amount model in video playback is as shown in formula 2:

$$b(k+1) = b(k) - \frac{r(k)L}{c(k)} + L.$$  Formula 2

Since online bit rate decision can only rely on the throughput prediction value and there will be a certain error in the throughput prediction, the cancellation parameter is used in the embodiment of the present disclosure to represent the fluctuation of the cache amount caused by the throughput prediction error, and the cache amount model is expressed as a cache evolution model as in formula 3:

$$\hat{b}(k+1) = b(k) - \left(\frac{L}{\hat{c}(k)} + \xi(k)\right) r(k) + L;$$  Formula 3 where $\hat{b}(k+1)$ is a cache amount prediction value of the video block $F_k$ at the end of download, $\hat{c}(k)$ is a throughput prediction amount, and $\xi(k)$ is a cancellation parameter configured to cancel a throughput prediction error of the current to-be-downloaded video block $F_k$.

Based on the cache amount evolution model of formula 3, the bit rate selection may be defined as a randomized control problem, that is, following QoE-related objectives need to be considered when the bit rate is selected.

Objective 1) the bit rate is maximized.

When an available bandwidth is fully utilized, the bit rate reaches the maximum, and the network bandwidth utilization rate may be modeled as $$\frac{r(k)}{c(k)};$$

according to the cache evolution model (formula 2), it can be obtained, for the video block $F_k$, the smaller b(k+1) (the cache amount at the end of download of the video block $F_k$) i, the greater the broadband utilization rate achieved is.

Objective 2) the stuttering probability is minimized.

If there is video playback stuttering in the process of downloading the video block $F_k$, a value of the cache amount b(k+1) at the end of download of the video block $F_k$ is L (that is, the video block duration. Therefore, b(k+1) may be controlled to be greater than L to select the bit rate, so that no video playback stuttering occurs in the process of downloading the video block $F_k$.

Objective 3) the bit rate change is minimized.

The minimum bit rate change may be realized by minimizing $\{|\Delta r(k)|=|r(k)-r(k-1)|\}$.

It can be seen that there are contradictions between objectives 1) to 3). To maximize the bit rate, b(k+1) is expected to be as small as possible, and to minimize the stuttering probability, it is desirable to maintain a large b(k+1) to absorb network bandwidth jitter. In addition, the objective of minimizing the bit rate change is also in contradiction with the objective of selecting the optimal bit rate, and since the ultimate objective of rate adaptation is to optimize the overall QoE, embodiments of the present disclosure provide a solution for comprehensively optimizing the objectives 1) to 3).

In some embodiments of the present disclosure, the objectives 1) to 3) are expressed in the form of a bit rate cost function to define the video playback quality loss value generated by each step of bit rate strategy, a function value of the bit rate cost function represents the video playback quality loss value, the requested bit rate is selected for each video block by minimizing the bit rate cost function value, the objective 1) and the objective 2) are combined to control the cache amount prediction value $\hat{b}(k+1)$ on the cache amount target value $b_r(k+1)$, and the bit rate cost function is defined as the following formula 4:

$$J = \sum_{j=1}^{N} \left[\hat{b}(k+j) - b_r(k+j)\right]^2 + \lambda \Delta r^2(k); \qquad \text{Formula 4}$$

where $\Delta r(k)=r(k)-r(k-1)$, that is, formula 4 may also be expressed as the following formula 5:

$$J = \sum_{j=1}^{N} \left[\hat{b}(k+j) - b_r(k+j)\right]^2 + \lambda [r(k)-r(k-1)]^2 \qquad \text{Formula 5}$$

where J in formula 4 and formula 5 is the bit rate cost function value, that is, the video playback quality loss value, j is a positive integer in [1, N], $\hat{b}(k+j)$ is a cache amount prediction value of the video block at the end of download of a (k+j−1)-th video block $F_{k+j-1}$, $b_r(k+j)$ is a cache amount target value of the video block at the end of download of the video block $F_{k+j-1}$, $[\hat{b}(k+j)-b_r(k+j)]$ is a cache prediction error between the cache amount prediction value and the cache amount target value of the video block $F_{k+j-1}$, r(k) and r(k−1) are bit rates of a k-th video block $F_k$ and a (k−1)-th video block $F_{k-1}$, and $\lambda$ is a penalty factor for switching the bit rates.

In the embodiment of the present disclosure, the value of $\lambda$ may be, but is not limited to, set to be (10/Rmax), and Rmax is the maximum selectable bit rate.

Figure 3:
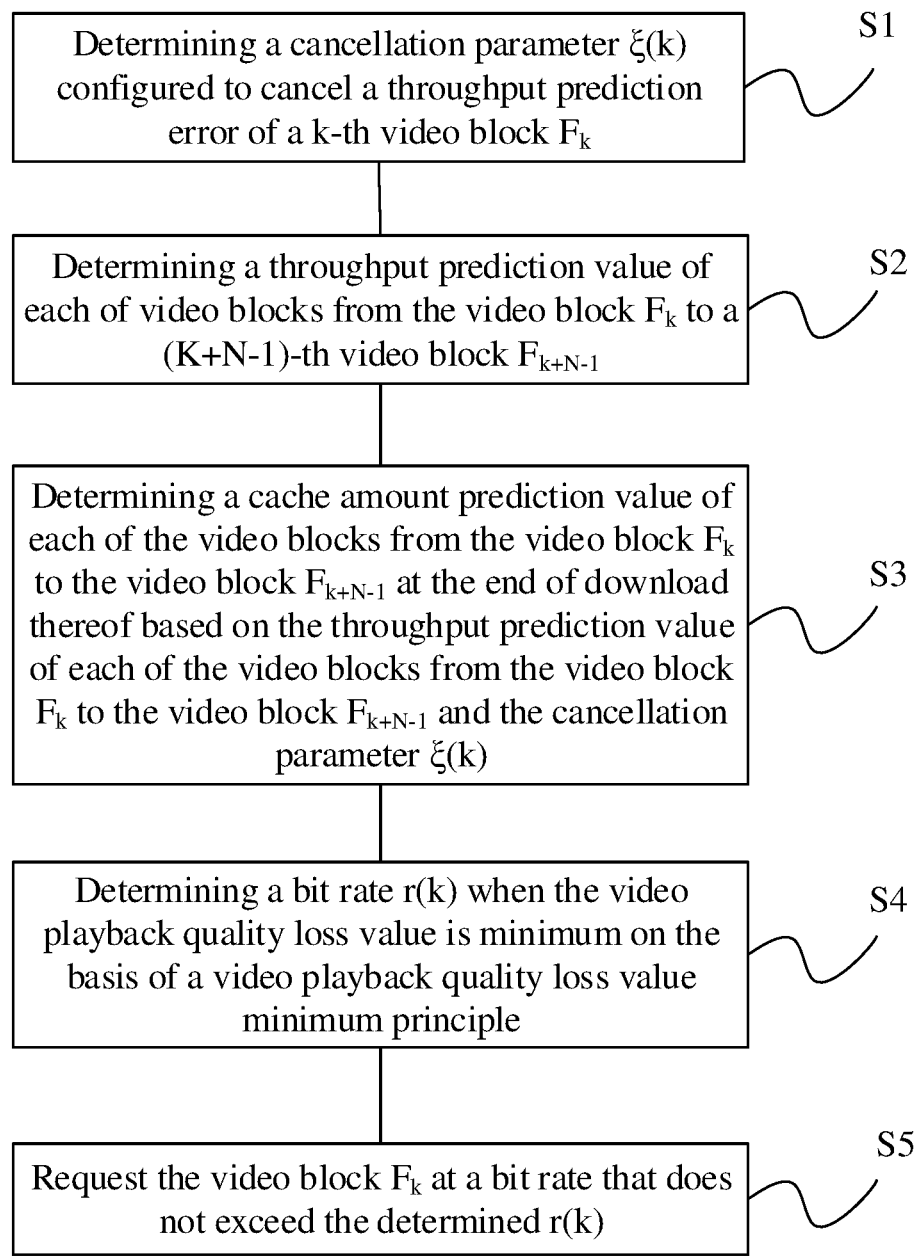
FIG. 3 is a schematic diagram of a video bit rate determining method provided according to an embodiment of the present disclosure.

In some embodiments, formula 4 and the strategy of the condition (that is, formula 3) satisfied by the cache amount may be used to select the bit rate r(k) for the current video block $F_k$, and as shown in FIG. 3, main steps are as follows.

Step S1: determining the cancellation parameter $\xi(k)$ configured to cancel the throughput prediction error of the k-th video block $F_k$.

The video block $F_k$ is the current to-be-downloaded video block.

In some embodiments of the present disclosure, the cancellation parameter $\xi(k)$ of the video block $F_k$ may be determined by, but not limited to, a manner of matrix estimation.

In some embodiments, the following variable matrix $\phi(k)$ and parameter matrix $\theta(k)$ are defined, the variable matrix is as the following formula 6, and the parameter matrix is as the following formula 7:

$$\phi(k) = \left[b(k-1), \frac{r(k-1)}{c(k-1)}, r(k-1), L\right]^T; \qquad \text{Formula 6}$$

$$\theta(k) = [1, -L, -\xi(k), 1]^T; \qquad \text{Formula 7}$$

where $\xi(k)$ is obtained by estimation $\hat{\theta}(k)$. The calculation mode of $\hat{\theta}(k)$ is as follows:

based on the estimation $\hat{\theta}(k-1)$ of $\phi(k)$ and $\theta$ at a (k−1)-th step (that is, the estimation for the (k−1)-th video block $F_{k-1}$), estimation $\hat{\theta}(k)$ of $\theta$ at a k-th step (that is, the estimation for the video block $F_k$) is obtained through the following formulas:

$$\hat{\theta}(k) = \hat{\theta}(k-1) + \Delta\hat{\theta}(k);$$

$$\Delta\hat{\theta}(k) = W(k)\left[b(k) - \phi^T(k)\hat{\theta}(k-1)\right];$$

$$W(k) = \frac{P(k-1)\phi(k)}{\alpha + \phi^T(k)P(k-1)\phi(k)};$$

$$P(k) = \alpha^{-1}(I - W(k)\phi^T(k))P(k-1);$$

where W(k) is a bandwidth evolution variance, P(k) is a system prediction error, and a value of $\alpha$ may be set to be 0.8.

Furthermore, an opposite number of a third term in the parameter matrix estimation value $\hat{\theta}(k)$ is determined as the cancellation parameter $\xi(k)$ of the video block $F_k$.

Step S2: determining a throughput prediction value of each of video blocks from the video block $F_k$ to a (k+N−1)-th video block $F_{k+N-1}$.

1) A throughput prediction value $\hat{c}(k)$ of the video block $F_k$ is determined according to a download speed of each of video blocks from a (k−M)-th video block $F_{k-M}$ to the (k−1)-th video block $F_{k-1}$ in the history, and M is a positive integer greater than 1 and less than k.

In some embodiments, the download speed of each of the video blocks from the video block $F_{k-M}$ to the video block $F_{k-1}$ is input into the following formula 8, and the throughput prediction value $\hat{c}(k)$ of the video block $F_k$ is calculated and obtained:

$$\hat{c}(k) = \frac{M}{\sum_{i=1}^{M} \frac{1}{c(k-i)}}; \qquad \text{Formula 8}$$

where i is a positive integer in [1, M−j], j is a positive integer in [1, N], and c(k−i) is a download speed of a (k−i)-th video block $F_{k-i}$.

2) A throughput prediction value of each of the video blocks from a (k+1)-th video block $F_{k+1}$ to the video block $F_{k+N-1}$ is determined according to the throughput prediction value $\hat{c}(k)$ of the video block $F_k$.

In some embodiments, on the basis of the following formula 9, the throughput prediction value ĉ(k)~ĉ(k+N−1) of each of the video blocks from the video block $F_{k+1}$ to the video block $F_{k+N-1}$ is determined according to the throughput prediction value ĉ(k) of the video block $F_k$:

$$\hat{c}(k+j) = \frac{M}{\sum_{i=1}^{M-j} \frac{1}{c(k-i)} + \sum_{i=0}^{j-1} \frac{1}{\hat{c}(k+i)}};$$ Formula 9 where ĉ(k+j) is a throughput prediction value of a video block $F_{k+j}$, and ĉ(k+i) is a throughput prediction value of a video block $F_{k+i}$.

It should be noted that there is no fixed execution sequence for step S1 and step S2, and those skilled in the art may flexibly set according to actual needs.

Step S3: determining a cache amount prediction value of each of the video blocks from the video block $F_k$ to the video block $F_{k+N-1}$ at the end of download thereof, based on the throughput prediction value of each of the video blocks from the video block $F_k$ to the (k+N−1)-th video block $F_{k+N-1}$ and ξ(k).

The cache amount prediction value b̂(k+j) of any video block $F_{k+j-1}$ from the video block $F_k$ to the video block $F_{k+N-1}$ at the end of download thereof is determined based on the throughput prediction value of each of the video blocks from the video block $F_k$ to the video block $F_{k+N-1}$ and the cancellation parameter ξ(k), a following preset cache amount recursive formula (namely, Formula 10 and Formula 11), the bit rate r(k) of the video block $F_k$, and a throughput prediction value of each of video blocks from the video block $F_k$ to a (k+j−1)-th video block $F_{k+j-1}$ and ξ(k).

Formula 10 and Formula 11 that can be derived based on Formula 2 and Formula 3:

$$\hat{b}(k+j) = \hat{b}(k) - T_j r(k);$$ Formula 10

$$T_j = \sum_{i=1}^{j} \frac{L}{\hat{c}(k+i-1)} + \xi(k);$$ Formula 11 where in formula 9 and formula 10, i is a positive integer in [1, M−j], j is a positive integer in [1, N], and ĉ(k+i−1) is a throughput prediction value of a (k+i−1)-th video block $F_{k+i-1}$.

That is, the bit rate r(k) of the video block $F_k$, and the cache amount prediction value b̂(k+1)~b̂(k+N) of each of the video blocks from the video block $F_k$ to the video block $F_{k+N-1}$ at the end of download thereof may be derived based on the throughput prediction value ĉ(k)~ĉ(k+N−1) determined in step S2, the ξ(k) value determined in step S1, and formula 10 and formula 11.

Step S4: determining the bit rate r(k) when the video playback quality loss value is the minimum, based on the principle of the minimum video playback quality loss value.

It should be noted that, before step S4, it is necessary to determine the cache amount target value $b_r$ of each of the video blocks from the video block $F_k$ to the video block $F_{k+N-1}$ at the end of download thereof.

Then, the cache amount prediction value b̂(k+1)~b̂(k+N) of each of the video blocks from the video block $F_k$ to the video block $F_{k+N}$1 at the end of download thereof, and the corresponding cache amount target value $b_r(k+1) \sim b_r(k+N)$ are substituted into the bit rate cost function (that is, Formula 4 or Formula 5) to obtain the video playback quality loss value.

A bit rate strategy r(k) may be obtained by minimizing the problem Min J, then the bit rate r(k) when the video playback quality loss value is the minimum is obtained, and r(k) is as in formula 12:

$$r(k) = \frac{\sum_{j=1}^{N} T_j[b(k) + jL - b_r(k+j)] + r(k-1)}{1 + \sum_{j=1}^{N} T_j^2}.$$ Formula 12

Step S5: requesting the video block $F_k$ at a bit rate that does not exceed determined r(k).

After the maximum bit rate r(k) corresponding to the video block $F_k$ is obtained according to formula 12, the video block $F_k$ is requested at the bit rate that does not exceed r(k).

The following parts in embodiment of the present disclosure show the beneficial effects brought by the solution according to results of a simulation experiment of simulation software.

In some embodiments of the present disclosure, a simulation system DASH is used and includes an Nginx server and a player based on Dash.js, and the maximum cache amount of videos is set to be 30 seconds.

In the following, Robust Bitrate Control (RBC) is referred to as the bit rate selection strategy designed in embodiments of the present disclosure, and is implemented by modifying functions AbrController and BufferController in Dash.js, and a link capacity is set by Linux tc tool according to actual measured bandwidth data.

In order to evaluate the algorithm provided in embodiments of the present disclosure under the actual network conditions, we use a test bandwidth trajectory generated on the basis of a Federal Communications Commission (FCC) network data set and a high speed downlink packet access (HSDPA) network data set. These two data sets respectively collect continuously measured throughput data of mobile devices when the videos are played under a 3G/HSDPA mobile wireless network of Norway Telenor and an FCC network.

Algorithms are tested.

1) RBC: for the bit rate selection strategy designed in the embodiment of the present disclosure, a target cache trajectory may be shown in formula 13:

$$b_r(k+1) = 0.7b(k) + 0.3B_r;$$ Formula 13 where $b_r(k+1)$ is the cache amount target value of a video block $F_{k+1-1}$, b(k) is the cache amount when the video block $F_k$ starts to download (that is, the cache amount at the end of download of the video block $F_{k-1}$), and the value of $B_r$ is set to be 10 seconds.

In the bit rate cost function of formula 4 and formula 5, the penalty factor λ for switching the bit rates may be set to be $2.5 \times 10^{-3}$, and when predicting ξ(k) in step S1, a value of a system prediction error P(k) may be set to be 1.

2) A broadband-based bit rate selection strategy FESTIVE.

The algorithm mainly estimates the subsequent network bandwidth based on the user's network changes in the previous period of time, and then selects a bit rate suitable for the user according to the estimated bandwidth, and the selected bit rate does not exceed the maximum selectable bit rate of the current bandwidth.

3) A cache-based bit rate selection strategy, such as a buffer based algorithm (BBA).

4) A cache-based bit rate selection strategy, such as near-optimal bitrate adaptation for online videos, referred to as BOLA for short.

The strategies are cache-based because changes in a user's network environment will eventually be reflected in the user's cache, which is a cache-based ABR algorithm designed using Lyapunov optimization. In essence, the BOLA bit rate selection strategy is a mapping from the current cache amount to the optional bit rate.

5) A bit rate selection strategy MPC based on the current cache amount and the predicted throughput.

The bit rate is selected by maximizing the QoE function of future 5 video blocks.

6) A bit rate selection strategy Robust MPC based on the current cache amount and the predicted throughput.

The same bit rate selection method as MPC is used. In order to alleviate the impact of prediction errors, Robust MPC divides the throughput prediction value by the maximum prediction error observed in 5 historical video blocks to implement conservative prediction.

Evaluation indicators of embodiments of the present disclosure: performance is evaluated from QoE influencing factors and comprehensive QoE, and QoE influencing factors include: the video bit rate, the stuttering time, and bit rate switching.

In order to evaluate the comprehensive QoE, the embodiment of the present disclosure adopts the QoE model defined by the MPC, and the model is shown in formula 1.

Figure 4:
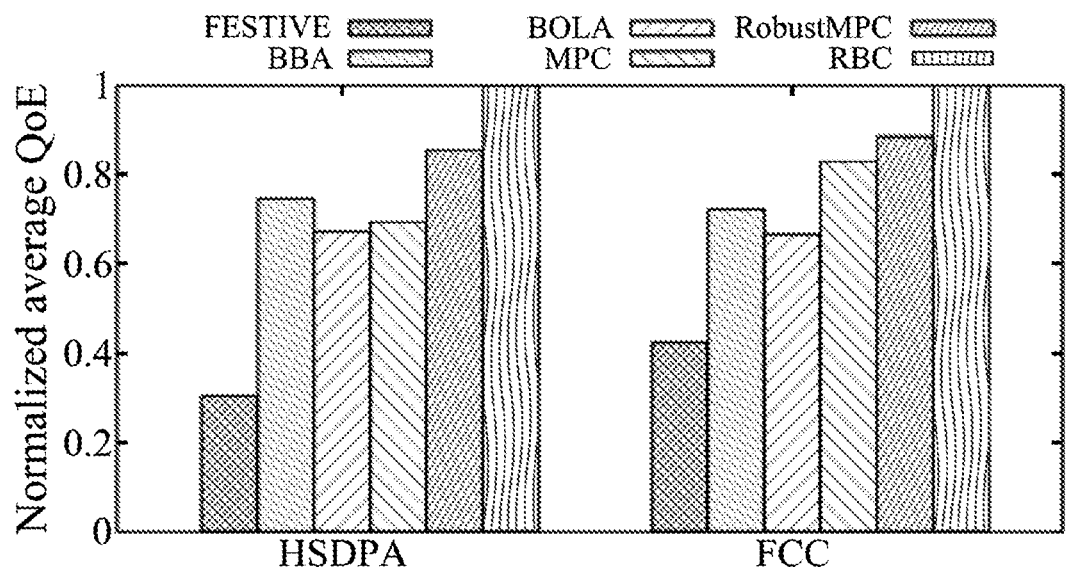
FIG. 4 is a schematic diagram of average QoE realized by each ABR algorithm on HSDPA and FCC networks provided according to an embodiment of the present disclosure.

Statistical performance: FIG. 4 compares the average QoE realized by each bit rate selection strategy on the HSDPA and FCC networks, and normalizes the results of different algorithms on the basis of RBC.

Figure 5:
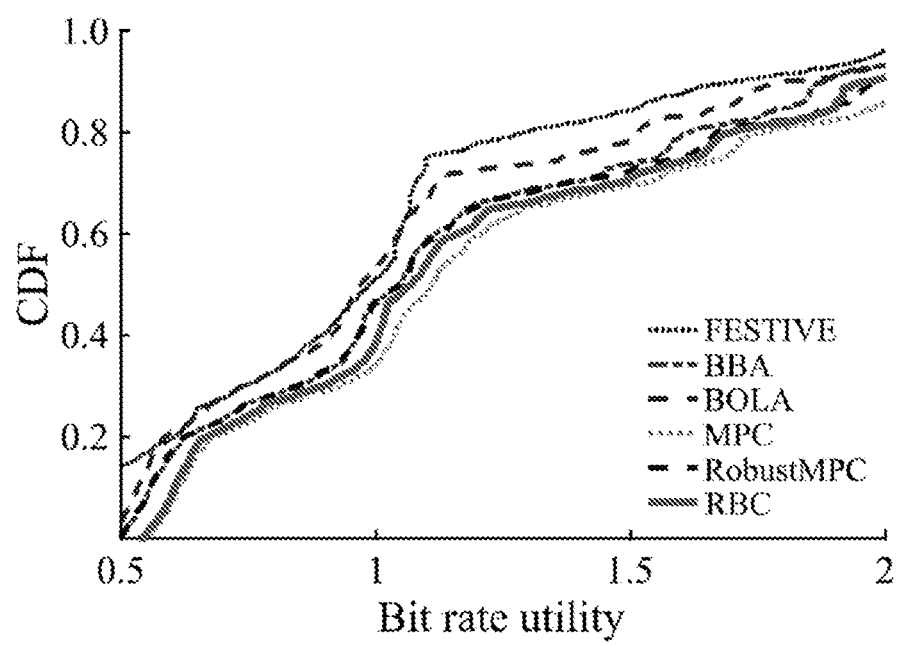
FIG. 5 is a schematic diagram of bit rate utility performance of each algorithm on an FCC network data set provided according to an embodiment of the present disclosure.
Figure 6:
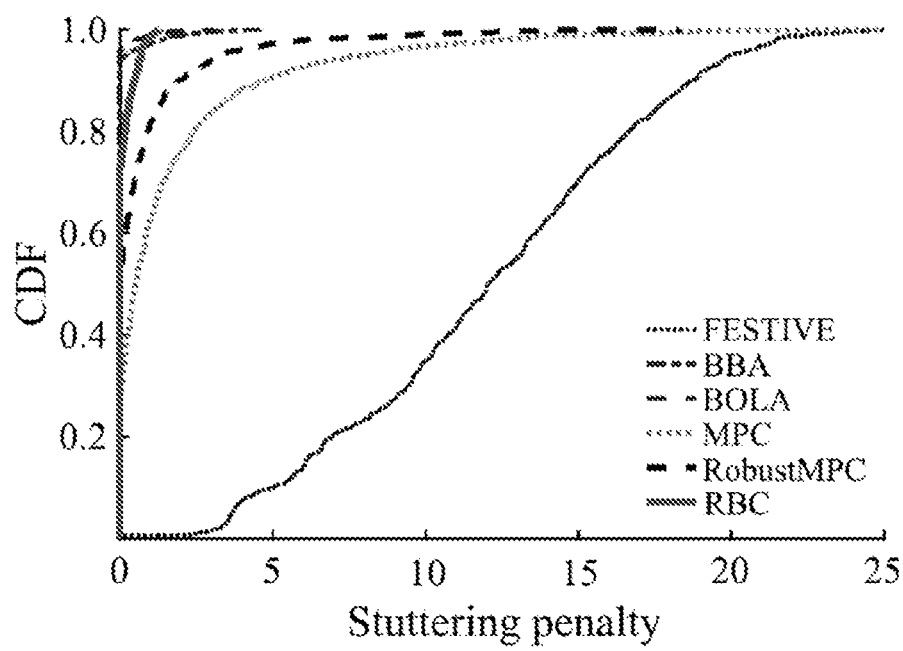
FIG. 6 is a schematic diagram of stuttering penalty performance of each algorithm on an FCC network data set provided according to an embodiment of the present disclosure.
Figure 7:
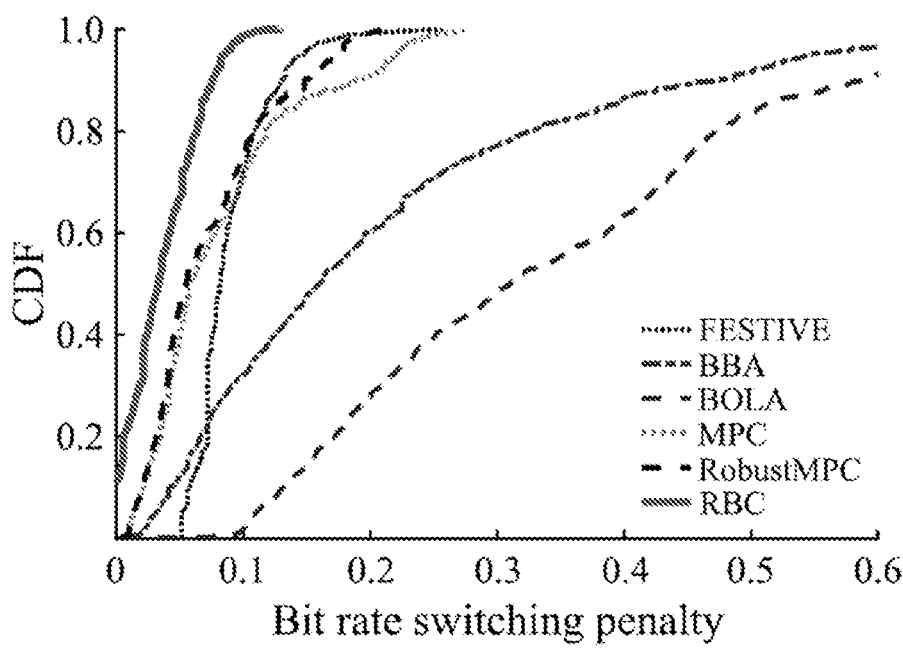
FIG. 7 is a schematic diagram of bit rate switching penalty performance of each algorithm on an FCC network data set provided according to an embodiment of the present disclosure.
Figure 8:
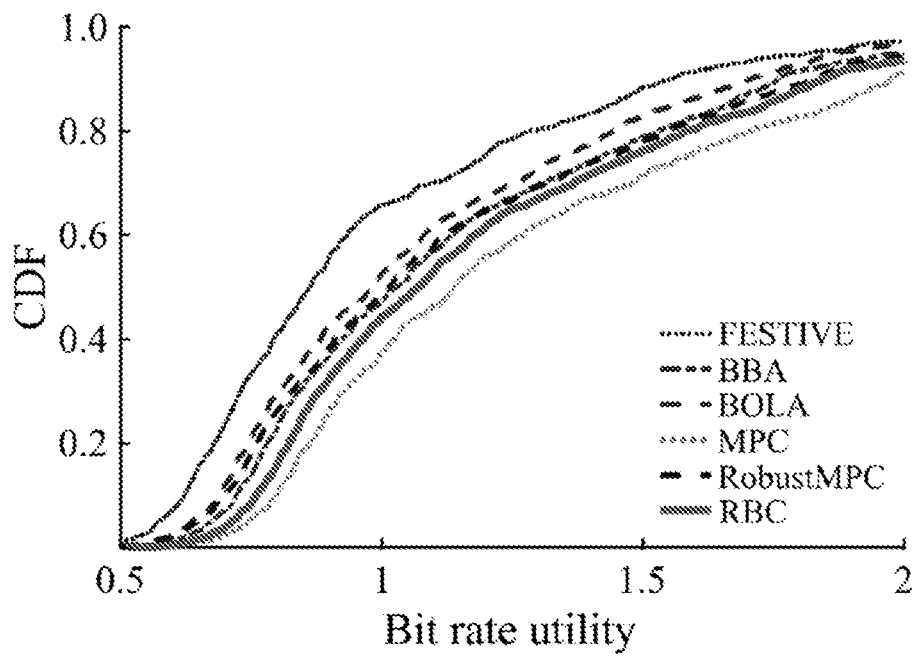
FIG. 8 is a schematic diagram of bit rate utility performance of each algorithm on an HSDPA network data set provided according to an embodiment of the present disclosure.
Figure 9:
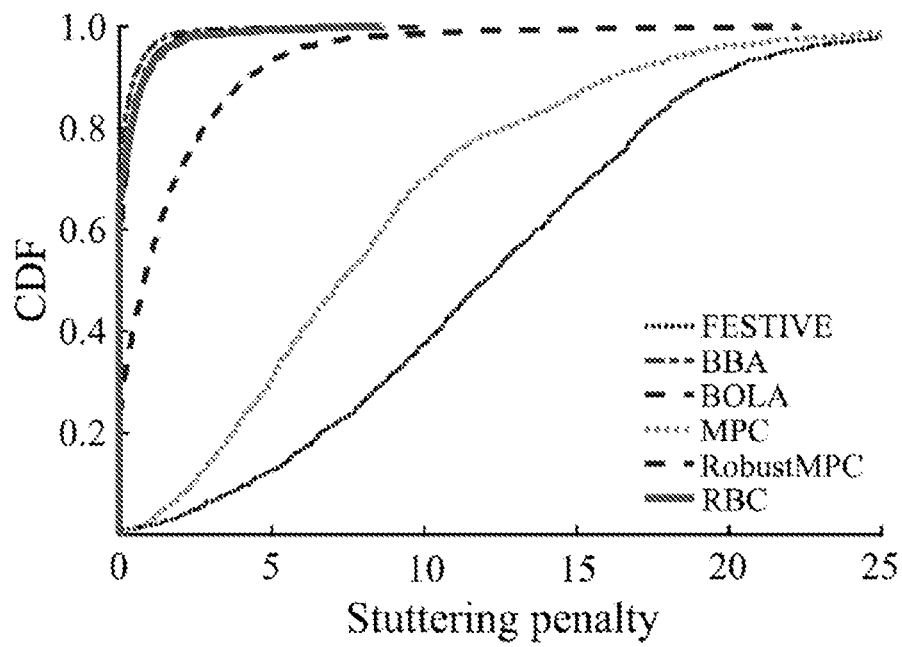
FIG. 9 is a schematic diagram of stuttering penalty performance of each algorithm on an HSDPA network data set provided according to an embodiment of the present disclosure.
Figure 10:
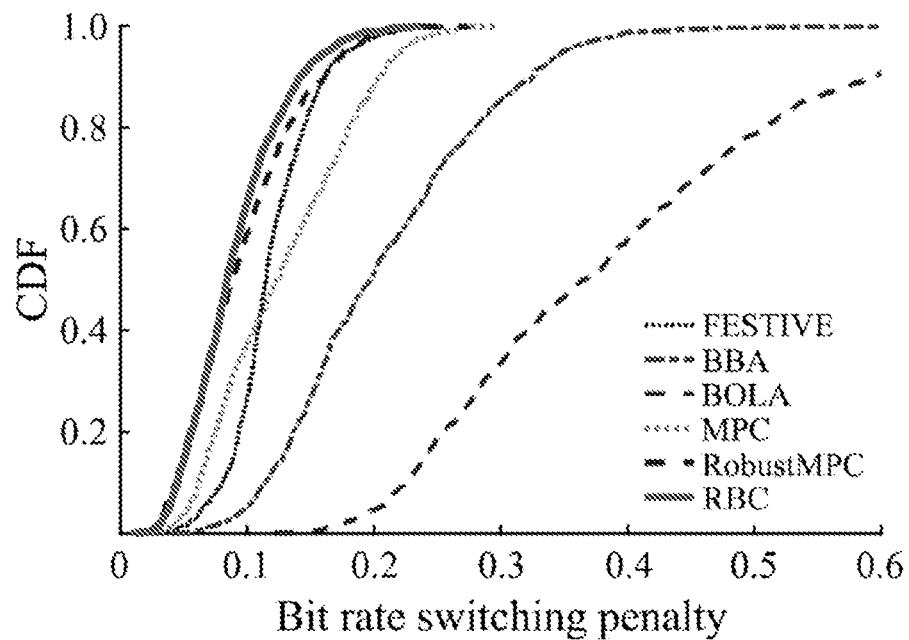
FIG. 10 is a schematic diagram of bit rate switching penalty performance of each algorithm on an HSDPA network data set provided according to an embodiment of the present disclosure.

FIGS. 5 to 7 show the detailed performance of each algorithm on the QoE influencing factors on the FCC network data set in the form of a cumulative distribution function (CDF); and FIGS. 8 to 10 show the detailed performance of each algorithm on the QoE influencing factors on the HSDPA network data set in the form of a CDF graph. It can be seen from the performance of each algorithm on various QoE influencing factors that RBC provides the best comprehensive QoE under all test network conditions, and by combining QoE optimization and cache control, RBC can achieve less stuttering time than optimization-based algorithms (Robust MPC and MPC) and achieve a better balance between the QoE influencing factors than buffer-based methods (BBA and BOLA).

In the HSDPA network with the large bandwidth fluctuation, the decision-making process of MPC is severely affected by the prediction errors, and the bit rate selected by MPC produces quite serious stuttering, resulting in comprehensive QoE even worse than heuristic BBA. By conservatively predicting the bandwidth, Robust MPC can conservatively select the bit rate when the bandwidth prediction is inaccurate, which is more robust than MPC. Therefore, Robust MPC can reduce the stuttering time.

In the FCC network, Robust MPC and RBC have similar performances. However, because Robust MPC only indirectly increases the average level of the cache amount without controlling the evolution of the cache amount, the cache amount jitters severely, and there is still a large stuttering risk.

In the HSDPA network, stuttering is still an important problem faced by Robust MPC. In contrast, RBC, BBA and BOLA can maintain a low play stuttering rate in the HSDPA and FCC networks. The experimental results prove the advantage of controlling the cache amount in improving the anti-network-interference aspect of the system.

The simulation results based on a real video player and a real throughput trajectory show that the method RBC provided by the embodiment of the present disclosure can accurately control the cache amount at the target level, and can simultaneously achieve low time delay, less stuttering and high bit rate.

Figure 11:
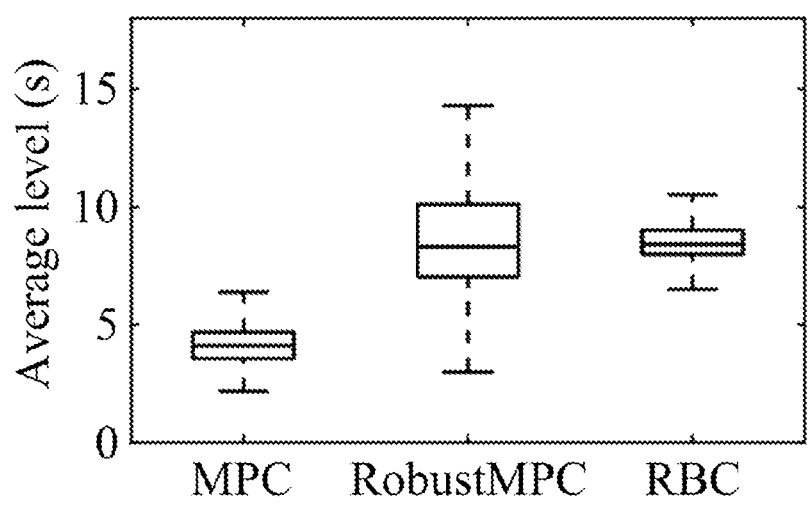
FIG. 11 is a schematic diagram of a comparison of an average level of cache amount change realized by an algorithm on a bandwidth data set provided according to an embodiment of the present disclosure.
Figure 12:
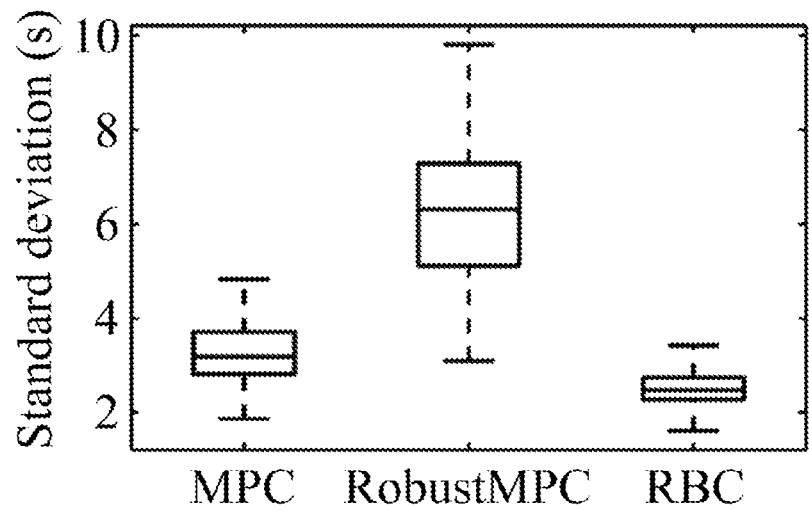
FIG. 12 is a schematic diagram of a comparison of standard deviation of cache amount change realized by an algorithm on a bandwidth data set provided according to an embodiment of the present disclosure.

Cache amount stability: FIGS. 11 and 12 compare the statistical characteristics of the cache amount changes realized by the algorithms on a bandwidth data set. It can be seen that the average cache amount of MPC is very small, and therefore, any prediction error and throughput burst jitter will cause stuttering. Although Robust MPC maintains a large cache amount, the cache amount fluctuates very sharply and the standard deviation is large, so stuttering events still occur frequently. By combining cache control and QoE optimization, only RBC can accurately control the cache amount at a desired level.

Figure 13:
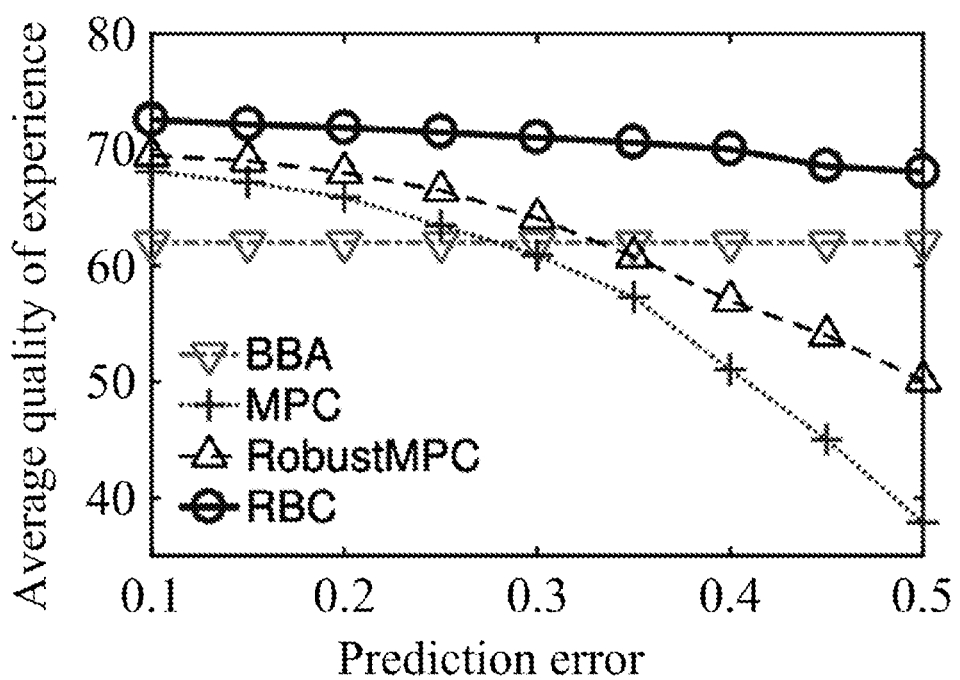
FIG. 13 is a schematic diagram of change of average QoE of each algorithm along with a bandwidth prediction value provided according to an embodiment of the present disclosure.

Robustness to the prediction errors: in order to test the influence of the prediction errors on the algorithms, we multiply the actual network bandwidth by Gaussian noise N(1, e) to simulate a bandwidth prediction value. FIG. 13 shows the change of the average QoE along with a parameter e. As expected, RBC is almost unaffected, while MPC and Robust MPC will suffer considerable QoE degradation due to bandwidth prediction deviations.

Figure 14:
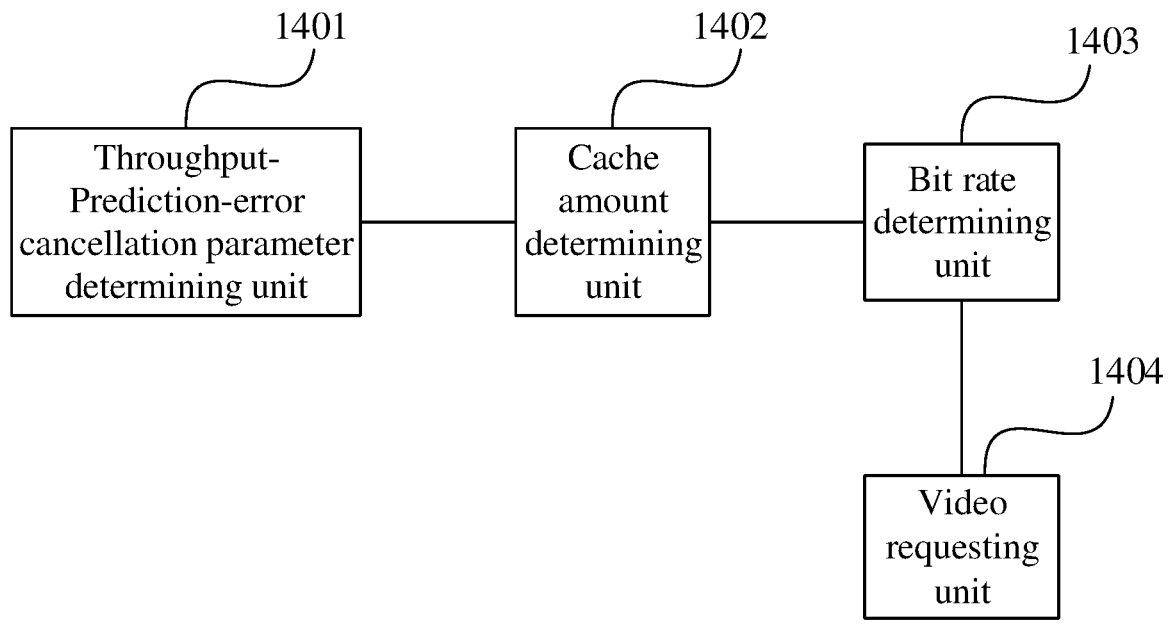
FIG. 14 is a schematic diagram of a video bit rate determining apparatus provided according to an embodiment of the present disclosure.

As shown in FIG. 14, based on the same inventive concept, an embodiment of the present disclosure also provides a video bit rate determining apparatus, applied in a device for playing a video on the basis of consecutively numbered video blocks. The apparatus includes a throughput-prediction-error cancellation parameter determining unit 1401, a cache amount determining unit 1402, a bit rate determining unit 1403 and a video requesting unit 1404.

The throughput-prediction-error cancellation parameter determining unit 1401 is configured to determine a cancellation parameter $\xi(k)$ configured to cancel a throughput prediction error of a k-th video block $F_k$, and k is a positive integer.

The cache amount determining unit 1402 is configured to determine, on the basis of a throughput prediction value of each of video blocks from the video block $F_k$ to a (k+N−1)-th video block $F_{k+N-1}$ and the cancellation parameter $\xi(k)$, a cache amount prediction value of each of the video blocks from the video block $F_k$ to the video block $F_{k+N-1}$ at the end of download thereof, and N is a positive integer greater than 1.

The bit rate determining unit 1403 is configured to determine a video playback quality loss value according to a weight value of a bit rate change between adjacent video blocks requested and a cache prediction error between the cache amount prediction value and a preset cache amount target value of each of the video blocks from the video block $F_k$ to the video block $F_{k+N-1}$ at the end of download thereof, and determine a bit rate r(k) when the video playback quality loss value is minimum.

The video requesting unit 1404 is configured to request the video block $F_k$ at a bit rate that does not exceed r(k).

In some embodiments, the cache amount determining unit is configured to determine the throughput prediction value of each of the video blocks from the video block $F_k$ to the video block $F_{k+N-1}$ according to the following steps:

determining a throughput prediction value $ĉ(k)$ of the video block $F_k$ based on a download speed of each of video blocks from a (k−M)-th video block $F_{k-M}$ to a (k−1)-th video block $F_{k-1}$ in the history, M being a positive integer greater than 1 and less than k; and determining a throughput prediction value of each of the video blocks from a (k+1)-th video block $F_{k+1}$ to the video block $F_{k+N-1}$ on the throughput prediction value ĉ(k) of the video block $F_k$.

In some embodiments, the cache amount determining unit is configured to: input the download speed of each of the video blocks from the video block $F_{k-M}$ to the video block $F_{k-1}$ into the following formula, and calculate to obtain the throughput prediction value ĉ(k) of the video block $F_k$:

$$\hat{c}(k) = \frac{M}{\sum_{i=1}^{M} \frac{1}{c(k-i)}};$$

where i is a positive integer in [1, M−j], j is a positive integer in [1, N], and c(k−i) is a download speed of a (k−i)-th video block $F_{k-i}$.

In some embodiments, the cache amount determining unit is configured to calculate the throughput prediction value of each of the video blocks from the video block $F_{k+1}$ to the video block $F_{k+N-1}$ on the basis of the following formula:

$$\hat{c}(k+j) = \frac{M}{\sum_{i=1}^{M-j} \frac{1}{c(k-i)} + \sum_{i=0}^{j-1} \frac{1}{\hat{c}(k+i)}}$$

where ĉ(k+j) is a throughput prediction value of a (k+j)-th video block $F_{k+j}$, and ĉ(k+i) is a throughput prediction value of a (k+i)-th video block $F_{k+i}$.

In some embodiments, the cache amount determining unit is configured to:

determine the cache amount prediction value b̂(k+j) of any video block $F_{k+j-1}$ from the video block $F_k$ to the video block $F_{k+N-1}$ at the end of download thereof based on the throughput prediction value of each of the video blocks from the video block $F_k$ to the video block $F_{k+N-1}$ and the cancellation parameter ξ(k), a following preset cache amount recursive formula, the bit rate r(k) of the video block $F_k$, and a throughput prediction value of each of video blocks from the video block $F_k$ to a (k+j−1)-th video block $F_{k+j-1}$;

the cache amount recursive formula: b̂(k+j)=b̂(k)−T_jr(k); and $$T_j = \sum_{i=1}^{j} \frac{L}{\hat{c}(k+i-1)} + \xi(k);$$

where i is a positive integer in [1, M−j], j is a positive integer in [1, N], M is a positive integer greater than 1 and less than k, ĉ(k+i−1) is a throughput prediction value of a (k+i−1)-th video block and $F_{k+i-1}$, and L is a video block duration of the (k+i−1)-th video block $F_{k+i-1}$.

In some embodiments, the bit rate determining unit is configured to:

input the weight value of the bit rate change between the adjacent video blocks requested and the cache prediction error between the cache amount prediction value and the preset cache amount target value of each of the video blocks from the video block $F_k$ to the video block $F_{k+N-1}$ at the end of download thereof into the following formula, and calculate to obtain the video playback quality loss value:

$$J = \sum_{j=1}^{N} [\hat{b}(k+j) - b_r(k+j)]^2 + \lambda [r(k) - r(k-1)]^2,$$

where J is the video playback quality loss value, j is a positive integer in [1, N], b̂(k+j) is a cache amount prediction value of a (k+j−1)-th video block $F_{k+j-1}$ at the end of download thereof, $b_r$(k+j) is a cache amount target value of the video block $F_{k+j-1}$ at the end of the download thereof, [b̂(k+j)−$b_r$(k+j)] is a cache prediction error between the cache amount prediction value and the cache amount target value of the video block $F_{k+j-1}$, r(k) and r(k−1) are bit rates of the video block $F_k$ and a (k−1)-th video block $F_{k-1}$ respectively, and λ is a penalty factor for switching the bit rates.

Figure 15:
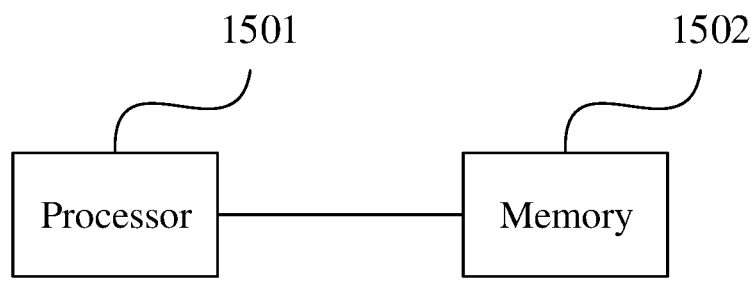
FIG. 15 is a schematic diagram of an electronic device provided according to an embodiment of the present disclosure.

As shown in FIG. 15, based on the same inventive concept, an embodiment of the present disclosure also provides an electronic device, including a processor 1501 and a memory 1502 configured to store an executable instruction of the processor. The processor is configured to execute the following processes:

determining a cancellation parameter ξ(k) configured to cancel a throughput prediction error of a k-th video block $F_k$, k being a positive integer;

determining a cache amount prediction value of each of the video blocks from the video block $F_k$ to the video block $F_{k+N-1}$ at the end of download thereof, based on a throughput prediction value of each of video blocks from the video block $F_k$ to a (k+N−1)-th video block $F_{k+N-1}$ and the cancellation parameter ξ(k), N being a positive integer greater than 1;

determining a video playback quality loss value based on a weight value of a bit rate change between adjacent video blocks requested and a cache prediction error between the cache amount prediction value and a preset cache amount target value of each of the video blocks from the video block $F_k$ to the video block $F_{k+N-1}$ at the end of download thereof, and a bit rate r(k) when the video playback quality loss value is minimum is determined; and requesting the video block $F_k$ at a bit rate that does not exceed r(k).

In some embodiments, the processor is configured to execute:

determining the throughput prediction value of each of the video blocks from the video block $F_k$ to the video block $F_{k+N-1}$ according to the following steps:

determining a throughput prediction value ĉ(k) of the video block $F_k$ based on a download speed of each of video blocks from a (k−M)-th video block $F_{k-M}$ to a (k−1)-th video block $F_{k-1}$ in the history, M being a positive integer greater than 1 and less than k; and determining a throughput prediction value of each of the video blocks from a (k+1)-th video block $F_{k+1}$ to the video block $F_{k+N-1}$ based on the throughput prediction value ĉ(k) of the video block $F_k$.

In some embodiments, the processor is configured to execute:

inputting the download speed of each of the video blocks from the video block $F_{k-M}$ to the video block $F_{k-1}$ into the following formula, and obtaining the throughput prediction value ĉ(k) of the video block $F_k$ through calculation:

$$\hat{c}(k) = \frac{M}{\sum_{i=1}^{M} \frac{1}{c(k-i)}};$$

where i is a positive integer in [1, M−j], j is a positive integer in [1, N], and c(k−i) is a download speed of a (k−i)-th video block $F_{k-i}$.

In some embodiments, the processor is configured to execute:

determining the throughput prediction value of each of the video blocks from the video block $F_{k+1}$ to the video block $F_{k+N-1}$ based on the following formula:

$$\hat{c}(k+j) = \frac{M}{\sum_{i=1}^{M-j} \frac{1}{c(k-i)} + \sum_{i=0}^{j-1} \frac{1}{\hat{c}(k+i)}};$$

where $\hat{c}(k+j)$ is a throughput prediction value of a (k+j)-th video block $F_{k+j}$, and $\hat{c}(k+i)$ is a throughput prediction value of a (k+i)-th video block $F_{k-i}$.

In some embodiments, the processor is configured to execute:

determining the cache amount prediction value $\hat{b}(k+j)$ of any video block $F_{k+j-1}$ from the video block $F_k$ to the video block $F_{k+N-1}$ at the end of download thereof based on the throughput prediction value of each of the video blocks from the video block $F_k$ to the video block $F_{k+N-1}$ and the cancellation parameter ξ(k), a following preset cache amount recursive formula, the bit rate r(k) of the video block $F_k$, and a throughput prediction value of each of video blocks from the video block $F_k$ to a (k+j−1)-th video block $F_{k+j-1}$;

the cache amount recursive formula: $\hat{b}(k+j)=(k)-T_j r(k)$; and $$T_j = \sum_{i=1}^{j} \frac{L}{\hat{c}(k+i-1)} + \xi(k);$$

where i is a positive integer in [1, M−j], j is a positive integer in [1, N], M is a positive integer greater than 1 and less than k, $\hat{c}(k+i-1)$ is a throughput prediction value of a (k+i−1)-th video block $F_{k+i-1}$, and L is a video block duration of the (k+i−1)-th video block $F_{k+i-1}$.

In some embodiments, the processor is configured to execute:

inputting the weight value of the bit rate change between the adjacent video blocks requested and the cache prediction error between the cache amount prediction value and the preset cache amount target value of each of the video blocks from the video block $F_k$ to the video block $F_{k+N-1}$ at the end of download thereof into the following formula, and the video playback quality loss value is obtained through calculation:

$$J = \sum_{j=1}^{N} [\hat{b}(k+j) - b_r(k+j)]^2 + \lambda [r(k) - r(k-1)]^2;$$

where J is the video playback quality loss value, j is a positive integer in [1, N], $\hat{b}(k+j)$ is a cache amount prediction value of a (k+j−1)-th video block $F_{k+j-1}$ at the end of download thereof, $b_r(k+j)$ is a cache amount target value of the video block $F_{k+j-1}$ at the end of the download thereof, $[\hat{b}(k+j)-b_r(k+j)]$ is a cache prediction error between the cache amount prediction value and the cache amount target value of the video block $F_{k+j-1}$, r(k) and r(k−1) are bit rates of the video block $F_k$ and a (k−1)-th video block $F_{k-1}$ respectively, and λ is a penalty factor for switching the bit rates.

Based on the same inventive concept, an embodiment of the present disclosure also provides a storage medium including instructions, such as a memory including instructions, and the instructions may be executed by a processor of the electronic device to complete the above-mentioned method. Optionally, the storage medium may be a computer readable non-volatile storage medium, for example, the computer readable non-volatile storage medium may be a ROM, a random access memory (RAM), a CD-ROM, a magnetic tape, a floppy disk, and an optical data storage device, etc.

Other embodiments of the present disclosure will be apparent to those skilled in the art from consideration of the specification and practice of the disclosure herein. The present disclosure is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the following claims.

It should be understood that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for determining a video bit rate, applied in a device for playing a video based on consecutively numbered video blocks, and comprising:

determining a cancellation parameter ξ(k) configured to cancel a throughput prediction error of a k-th video block $F_k$, k being a positive integer;

determining a cache amount prediction value of each of video blocks from the video block $F_k$ to a (k+N−1)-th video block $F_{k+N-1}$ at the end of download thereof, based on a throughput prediction value of each of the video blocks from the video block $F_k$ to the (k+N−1)-th video block $F_{k+N-1}$ and the cancellation parameter ξ(k), N being a positive integer greater than 1;

determining a video playback quality loss value based on a weight value of a bit rate change between adjacent video blocks requested and a cache prediction error between the cache amount prediction value and a preset cache amount target value of each of the video blocks from the video block $F_k$ to the (k+N−1)-th video block $F_{k+N-1}$ at the end of download thereof, and determining a bit rate r(k) in response to the video playback quality loss value being minimum; and requesting the video block $F_k$ at a bit rate that does not exceed the bit rate r(k).

2. The method according to claim 1, wherein the throughput prediction value of each of the video blocks from the video block $F_k$ to the (k+N−1)-th video block $F_{k+N-1}$ is determined based on followings:

determining a throughput prediction value $\hat{c}(k)$ of the video block $F_k$ based on a download speed of each of video blocks from a (k−M)-th video block $F_{k-M}$ to a (k−1)-th video block $F_{k-1}$, M being a positive integer greater than 1 and less than k; and determining a throughput prediction value of each of the video blocks from a (k+1)-th video block $F_{k+1}$ to the (k+N−1)-th video block $F_{k+N-1}$ based on the throughput prediction value ĉ(k) of the video block $F_k$.

3. The method according to claim 2, wherein said determining the throughput prediction value ĉ(k) of the video block $F_k$ according to the download speed of each of the video blocks from the (k−M)-th video block $F_{k-M}$ to the (k−1)-th video block $F_{k-1}$, comprises:

obtaining the throughput prediction value ĉ(k) of the video block $F_k$ by inputting the download speed of each of the video blocks from the (k−M)-th video block $F_{k-M}$ to the (k−1)-th video block $F_{k-1}$ into a following formula:

$$ĉ(k) = \frac{M}{\sum_{i=1}^{M} \frac{1}{c(k-i)}};$$

wherein i is a positive integer in [1, M−j], j is a positive integer in [1, N], and c(k−i) is a download speed of a (k−i)-th video block $F_{k-i}$.

4. The method according to claim 3, wherein said determining the throughput prediction value of each of the video blocks from the (k+1)-th video block $F_{k+1}$ to the (k+N−1)-th video block $F_{k+N-1}$ based on the throughput prediction value ĉ(k) of the video block $F_k$, comprises:

obtaining the throughput prediction value of each of the video blocks from the (k+1)-th video block $F_{k+1}$ to the video block (k+N−1)-th $F_{k+N-1}$ based on a following formula:

$$ĉ(k+j) = \frac{M}{\sum_{i=1}^{M-j} \frac{1}{c(k-i)} + \sum_{i=0}^{j-1} \frac{1}{ĉ(k+i)}};$$

wherein ĉ(k+j) is a throughput prediction value of a (k+j)-th video block $F_{k+j}$, and ĉ(k+i) is a throughput prediction value of a (k+i)-th video block $F_{k+i}$.

5. The method according to claim 1, wherein said determining the cache amount prediction value of each of the video blocks from the video block $F_k$ to the (k+N−1)-th video block $F_{k+N-1}$ at the end of download thereof, comprises:

determining the cache amount prediction value b̂(k+j) of any video block $F_{k+j-1}$ from the video block $F_k$ to the (k+N−1)-th video block $F_{k+N-1}$ at the end of download thereof based on the throughput prediction value of each of the video blocks from the video block $F_k$ to the (k+N−1)-th video block $F_{k+N-1}$ and the cancellation parameter ξ(k), a cache amount recursive formula, the bit rate r(k) of the video block $F_k$, and a throughput prediction value of each of video blocks from the video block $F_k$ to a (k+j−1)-th video block $F_{k+j-1}$;

the cache amount recursive formula being b̂(k+j)=b̂(k)−$T_j$r(k); and $$T_j = \sum_{i=1}^{j} \frac{L}{ĉ(k+i-1)} + \xi(k);$$

wherein i is a positive integer in [1, M−j], j is a positive integer in [1, N], M is a positive integer greater than 1 and less than k, ĉ(k+i−1) is a throughput prediction value of a (k+i−1)-th video block $F_{k+i-1}$, and L is a video block duration of the (k+i−1)-th video block $F_{k+i-1}$.

6. The method according to claim 1, wherein said determining the video playback quality loss value, comprises:

obtaining the video playback quality loss value by inputting the weight value of the bit rate change between the adjacent video blocks requested and the cache prediction error between the cache amount prediction value and the preset cache amount target value of each of the video blocks from the video block $F_k$ to the (k+N−1)-th video block $F_{k+N-1}$ at the end of download thereof into a following formula:

$$J = \sum_{j=1}^{N} [b̂(k+j) - b_r(k+j)]^2 + \lambda[r(k) - r(k-1)]^2;$$

wherein J is the video playback quality loss value, j is a positive integer in [1, N], b̂(k+j) is a cache amount prediction value of a (k+j−1)-th video block $F_{k+j-1}$ at the end of download thereof, $b_r$(k+j) is a cache amount target value of the video block $F_{k+j-1}$ at the end of the download thereof, [b̂(k+j)−$b_r$(k+j)] is a cache prediction error between the cache amount prediction value and the cache amount target value of the (k+j−1)-th video block $F_{k+j-1}$, r(k) and r(k−1) are bit rates of the video block $F_k$ and a (k−1)-th video block $F_{k-1}$ respectively, and λ is a penalty factor for switching the bit rates.

7. An electronic device, comprising a processor and a memory configured to store an executable instruction of the processor, wherein the processor is configured to:
determine a cancellation parameter ξ(k) configured to cancel a throughput prediction error of a k-th video block $F_k$, k being a positive integer;
determine a cache amount prediction value of each of the video blocks from the video block $F_k$ to a (k+N−1)-th video block $F_{k+N-1}$ at the end of download thereof based on a throughput prediction value of each of video blocks from the video block $F_k$ to the (k+N−1)-th video block $F_{k+N-1}$ and the cancellation parameter ξ(k), N being a positive integer greater than 1;
determine a video playback quality loss value based on a weight value of a bit rate change between adjacent video blocks requested and a cache prediction error between the cache amount prediction value and a preset cache amount target value of each of the video blocks from the video block $F_k$ to the (k+N−1)-th video block $F_{k+N-1}$ at the end of download thereof, and determine a bit rate r(k) in response to the video playback quality loss value being minimum; and
request the video block $F_k$ at a bit rate that does not exceed the bit rate r(k).

8. The electronic device according to claim 7, wherein the processor is configured to:
determine the throughput prediction value of each of the video blocks from the video block $F_k$ to the (k+N−1)-th video block $F_{k+N-1}$ based on followings:
determining a throughput prediction value ĉ(k) of the video block $F_k$ based on a download speed of each of video blocks from a (k−M)-th video block $F_{k-M}$ to a (k−1)-th video block $F_{k-1}$, M being a positive integer greater than 1 and less than k; and determining a throughput prediction value of each of the video blocks from a (k+1)-th video block $F_{k+1}$ to the (k+N−1)-th video block $F_{k+N-1}$ based on the throughput prediction value $\hat{c}(k)$ of the video block $F_k$.

9. The electronic device according to claim 8, wherein the processor is configured to:

obtain the throughput prediction value $\hat{c}(k)$ of the video block $F_k$ by inputting the download speed of each of the video blocks from the (k−M)-th video block $F_{k-M}$ to the (k−1)-th video block $F_{k-1}$ into a following formula:

$$\hat{c}(k) = \frac{M}{\sum_{i=1}^{M} \frac{1}{c(k-i)}};$$

wherein i is a positive integer in [1, M−j], j is a positive integer in [1, N], and c(k−i) is a download speed of a (k−i)-th video block $F_{k-i}$.

10. The electronic device according to claim 9, wherein the processor is configured to:

obtain the throughput prediction value of each of the video blocks from the (k+1)-th video block $F_{k+1}$ to the (k+N−1)-th video block $F_{k+N-1}$ based on a following formula:

$$\hat{c}(k+j) = \frac{M}{\sum_{i=1}^{M-j} \frac{1}{c(k-i)} + \sum_{i=0}^{j-1} \frac{1}{\hat{c}(k+i)}};$$

wherein $\hat{c}(k+j)$ is a throughput prediction value of a (k+j)-th video block $F_{k+j}$, and $\hat{c}(k+i)$ is a throughput prediction value of a (k+i)-th video block $F_{k+i}$.

11. The electronic device according to claim 7, wherein the processor is configured to:

determine the cache amount prediction value $\hat{b}(k+j)$ of any video block $F_{k+j-1}$ from the video block $F_k$ to the (k+N−1)-th video block $F_{k+N-1}$ at the end of download thereof based on the throughput prediction value of each of the video blocks from the video block $F_k$ to the (k+N−1)-th video block $F_{k+N-1}$ and the cancellation parameter ξ(k), a cache amount recursive formula, the bit rate r(k) of the video block $F_k$, and a throughput prediction value of each of video blocks from the video block $F_k$ to a (k+j−1)-th video block $F_{k+j-1}$;

the cache amount recursive formula being $\hat{b}(k+j)=\hat{b}(k)−T_j r(k)$; and $$T_j = \sum_{i=1}^{j} \frac{L}{\hat{c}(k+i-1)} + \xi(k);$$

wherein i is a positive integer in [1, M−j], j is a positive integer in [1, N], M is a positive integer greater than 1 and less than k, $\hat{c}(k+i-1)$ is a throughput prediction value of a (k+i−1)-th video block $F_{k+i-1}$, and L is a video block duration of the (k+i−1)-th video block $F_{k+i-1}$.

12. The electronic device according to claim 7, wherein the processor is configured to:

obtain the video playback quality loss value by inputting the weight value of the bit rate change between the adjacent video blocks requested and the cache prediction error between the cache amount prediction value and the preset cache amount target value of each of the video blocks from the video block $F_k$ to the (k+N−1)-th video block $F_{k+N-1}$ at the end of download thereof into a following formula:

$$J = \sum_{j=1}^{N} \left[\hat{b}(k+j) - b_r(k+j)\right]^2 + \lambda[r(k) - r(k-1)]^2;$$

wherein J is the video playback quality loss value, j is a positive integer in [1, N], $\hat{b}(k+j)$ is a cache amount prediction value of a (k+j−1)-th video block $F_{k+j-1}$ at the end of download thereof, $b_r(k+j)$ is a cache amount target value of the (k+j−1)-th video block $F_{k+j-1}$ at the end of the download thereof, $[\hat{b}(k+j)−b_r(k+j)]$ is a cache prediction error between the cache amount prediction value and the cache amount target value of the (k+j−1)-th video block $F_{k+j-1}$, r(k) and r(k−1) are bit rates of the video block $F_k$ and a (k−1)-th video block $F_{k-1}$ respectively, and λ is a penalty factor for switching the bit rates.

13. A non-transitory computer storage medium, on which a computer program is stored, wherein a method for determining a video bit rate is implemented in response to the program being executed by a processor;

wherein the method comprises:

determining a cancellation parameter ξ(k) configured to cancel a throughput prediction error of a k-th video block $F_k$, k being a positive integer;

determining a cache amount prediction value of each of video blocks from the video block $F_k$ to a (k+N−1)-th video block $F_{k+N-1}$ at the end of download thereof, based on a throughput prediction value of each of the video blocks from the video block $F_k$ to the (k+N−1)-th video block $F_{k+N-1}$ and the cancellation parameter ξ(k), N being a positive integer greater than 1;

determining a video playback quality loss value based on a weight value of a bit rate change between adjacent video blocks requested and a cache prediction error between the cache amount prediction value and a preset cache amount target value of each of the video blocks from the video block $F_k$ to the (k+N−1)-th video block $F_{k+N-1}$ at the end of download thereof, and determining a bit rate r(k) in response to the video playback quality loss value being minimum; and requesting the video block $F_k$ at a bit rate that does not exceed the bit rate r(k).

14. The non-transitory computer storage medium according to claim 13, wherein the throughput prediction value of each of the video blocks from the video block $F_k$ to the (k+N−1)-th video block $F_{k+N-1}$ is determined based on followings:

determining a throughput prediction value $\hat{c}(k)$ of the video block $F_k$ based on a download speed of each of video blocks from a (k−M)-th video block $F_{k-M}$ to a (k−1)-th video block $F_{k-1}$, M being a positive integer greater than 1 and less than k; and determining a throughput prediction value of each of the video blocks from a (k+1)-th video block $F_{k+1}$ to the (k+N−1)-th video block $F_{k+N-1}$ based on the throughput prediction value ĉ(k) of the video block $F_k$.

15. The non-transitory computer storage medium according to claim 14, wherein said determining the throughput prediction value ĉ(k) of the video block $F_k$ according to the download speed of each of the video blocks from the (k−M)-th video block $F_{k-M}$ to the (k−1)-th video block $F_{k-1}$, comprises:

obtaining the throughput prediction value ĉ(k) of the video block $F_k$ by inputting the download speed of each of the video blocks from the (k−M)-th video block $F_{k-M}$ to the (k−1)-th video block $F_{k-1}$ into a following formula:

$$\hat{c}(k) = \frac{M}{\sum_{i=1}^{M} \frac{1}{c(k-i)}};$$

wherein i is a positive integer in [1, M−j], j is a positive integer in [1, N], and c(k−i) is a download speed of a (k−i)-th video block $F_{k-i}$.

16. The non-transitory computer storage medium according to claim 15, wherein said determining the throughput prediction value of each of the video blocks from the (k+1)-th video block $F_{k+1}$ to the (k+N−1)-th video block $F_{k+N-1}$ based on the throughput prediction value ĉ(k) of the video block $F_k$, comprises:

obtaining the throughput prediction value of each of the video blocks from the (k+1)-th video block $F_{k+1}$ to the video block (k+N−1)-th $F_{k+N-1}$ based on a following formula:

$$\hat{c}(k+j) = \frac{M}{\sum_{i=1}^{M-j} \frac{1}{c(k-i)} + \sum_{i=0}^{j-1} \frac{1}{\hat{c}(k+i)}};$$

wherein ĉ(k+j) is a throughput prediction value of a (k+j)-th video block $F_{k+j}$, and ĉ(k+i) is a throughput prediction value of a (k+i)-th video block $F_{k+i}$.

17. The non-transitory computer storage medium according to claim 13, wherein said determining the cache amount prediction value of each of the video blocks from the video block $F_k$ to the (k+N−1)-th video block $F_{k+N-1}$ at the end of download thereof, comprises:

determining the cache amount prediction value b̂(k+j) of any video block $F_{k+j-1}$ from the video block $F_k$ to the (k+N−1)-th video block $F_{k+N-1}$ at the end of download thereof based on the throughput prediction value of each of the video blocks from the video block $F_k$ to the (k+N−1)-th video block $F_{k+N-1}$ and the cancellation parameter ξ(k), a cache amount recursive formula, the bit rate r(k) of the video block $F_k$, and a throughput prediction value of each of video blocks from the video block $F_k$ to a (k+j−1)-th video block $F_{k+j-1}$;

the cache amount recursive formula being b̂(k+j)= b̂(k)=$T_j$r(k); and $$T_j = \sum_{i=1}^{j} \frac{L}{\hat{c}(k+i-1)} + \xi(k);$$

wherein i is a positive integer in [1, M−j], j is a positive integer in [1, N], M is a positive integer greater than 1 and less than k, ĉ(k+i−1) is a throughput prediction value of a (k+i−1)-th video block $F_{k+i-1}$, and L is a video block duration of the (k+i−1)-th video block $F_{k+i-1}$.

18. The non-transitory computer storage medium according to claim 13, wherein said determining the video playback quality loss value, comprises:

obtaining the video playback quality loss value by inputting the weight value of the bit rate change between the adjacent video blocks requested and the cache prediction error between the cache amount prediction value and the preset cache amount target value of each of the video blocks from the video block $F_k$ to the (k+N−1)-th video block $F_{k+N-1}$ at the end of download thereof into a following formula:

$$J = \sum_{j=1}^{N} [\hat{b}(k+j) - b_r(k+j)]^2 + \lambda[r(k) - r(k-1)]^2;$$

wherein J is the video playback quality loss value, j is a positive integer in [1, N], b̂(k+j) is a cache amount prediction value of a (k+j−1)-th video block $F_{k+j-1}$ at the end of download thereof, $b_r(k+j)$ is a cache amount target value of the video block $F_{k+j-1}$ at the end of the download thereof, [b̂(k+j)−$b_r(k+j)$] is a cache prediction error between the cache amount prediction value and the cache amount target value of the (k+j−1)-th video block $F_{k+j-1}$, r(k) and r(k−1) are bit rates of the video block $F_k$ and a (k−1)-th video block $F_{k-1}$ respectively, and λ is a penalty factor for switching the bit rates.

* * * * *